United States Patent [19]

Kaetscher et al.

[11] Patent Number: 4,850,600

[45] Date of Patent: Jul. 25, 1989

[54] SEALING DEVICE FOR PIPE CONNECTORS DISCHARGING INTO A VESSEL, IN PARTICULAR A STEAM GENERATOR

[75] Inventors: Erich Kaetscher, Marloffstein; Jakob Stauner, Nuremberg; Alexander Huemmeler, Roettenbach, all of Fed. Rep. of Germany

[73] Assignee: Siemens Aktiengesellschaft, Munich, Fed. Rep. of Germany

[21] Appl. No.: 127,801

[22] Filed: Dec. 2, 1987

[30] Foreign Application Priority Data

Nov. 5, 1987 [DE] Fed. Rep. of Germany ....... 3737609

[51] Int. Cl.[4] ............................................... F16J 15/02
[52] U.S. Cl. ...................................... 277/101; 138/89; 220/314; 411/350
[58] Field of Search ........................... 277/101; 138/89; 220/256, 314, 315; 411/179, 340, 350, 351, 349, 337, 549, 550, 551, 347, 141, 546; 384/420

[56] References Cited

U.S. PATENT DOCUMENTS

| | | | |
|---|---|---|---|
| 2,593,712 | 4/1952 | Wells et al. | 220/314 X |
| 3,548,881 | 12/1970 | Pavan | 220/314 X |
| 4,083,468 | 4/1978 | Batchelor | 220/256 X |
| 4,279,356 | 7/1981 | Amorese et al. | 220/314 |
| 4,299,396 | 11/1981 | Becker et al. | 277/101 X |
| 4,335,883 | 6/1982 | Le Roux et al. | 277/101 X |
| 4,436,220 | 3/1984 | Simmons | 220/256 X |
| 4,667,701 | 5/1987 | Evans et al. | 220/314 X |
| 4,690,070 | 9/1987 | Miller | 220/314 X |

Primary Examiner—Frankie L. Stinson
Attorney, Agent, or Firm—Herbert L. Lerner; Laurence A. Greenberg

[57] ABSTRACT

A sealing device for pipe connectors discharging into a vessel includes a retaining ring having a flange and being disposed at the mouth of the pipe connector and tightly joined to the wall of the vessel. A rigid disk closes off the opening of the pipe connector. A seal is disposed between the rigid disk and the flange. Fast-action clamping elements extend through slits formed in the rigid disk and slits formed in the retaining ring. The fast-action clamping elements are supported on the disk and locked and braced on the retaining ring for securing the rigid disk to the flange with the interposition of the seal.

11 Claims, 4 Drawing Sheets

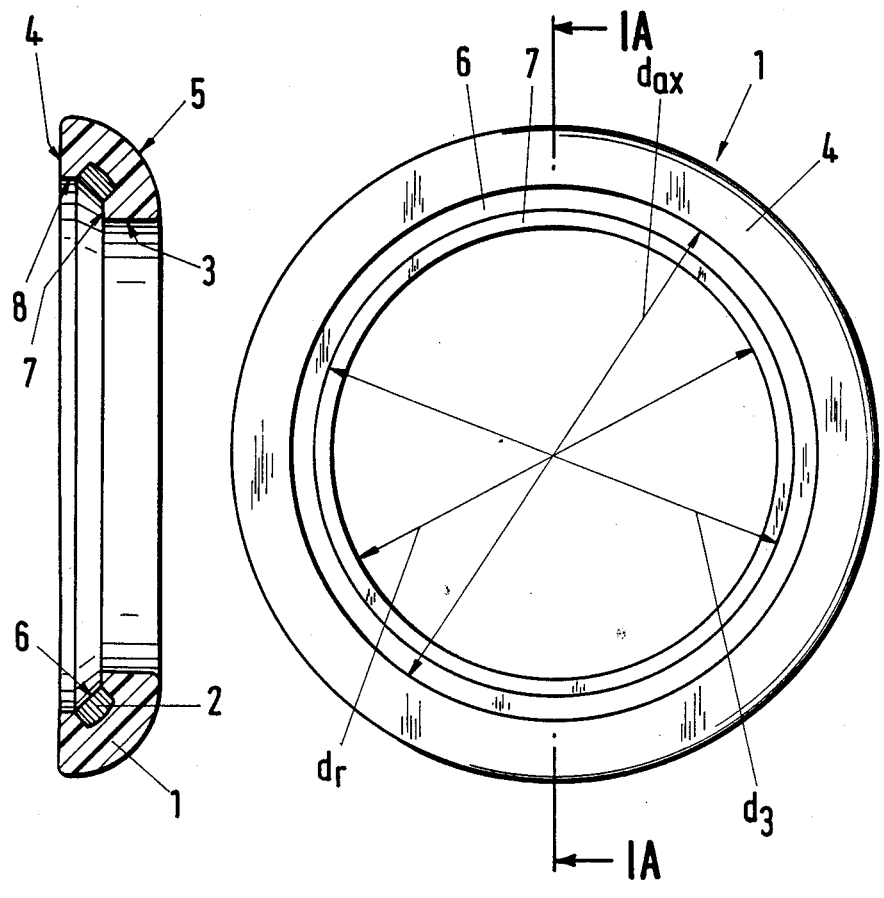
Fig. IA  Fig. I

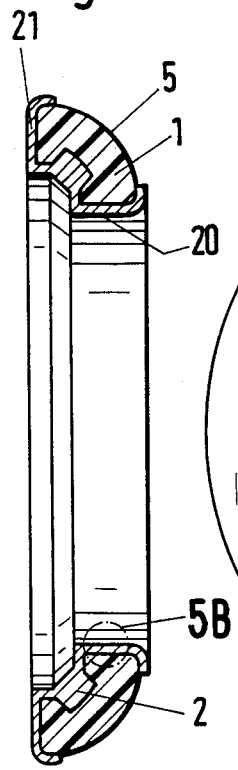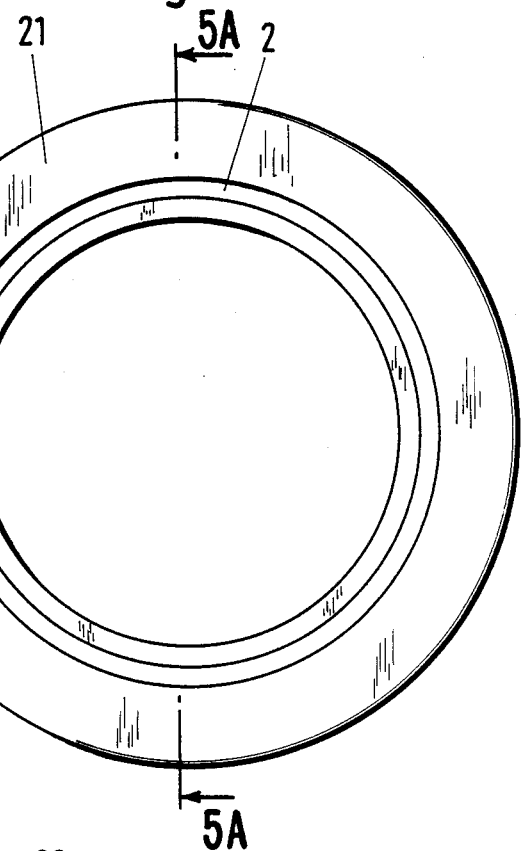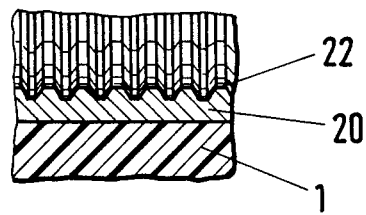
Fig. 5A
Fig. 5
Fig. 5B

SEALING DEVICE FOR PIPE CONNECTORS DISCHARGING INTO A VESSEL, IN PARTICULAR A STEAM GENERATOR

The invention relates to a sealing device that can be used for closing a pipe connector discharging into a vessel, in particular a steam generator.

European Published Application No. 0 014 878 discloses a sealing device that is made from a disk-shaped rigid body having radially displaceable locking bars on the periphery thereof, which are brought into engagement in recesses on the inner periphery of the connector and lock the sealing device in a predetermined position, after the introduction of the sealing device into a pipe connector. The side of the sealing device in contact with the fluid medium is coated with a sealing rubber skin, which merges with a sealing ring that can be inflated with a pressure medium at the outer periphery of the disk-like insert. The sealing ring is connected to a pressure medium reservoir through lines. In order to attain reliable sealing, two or more disk-like inserts can also be anchored in the pipeline or pipe connector with locking bars. The disk-like insert is assembled from individual segments that have fastening ribs in regions thereof adjacent one another. Openings for insertion bolts or screw bolts are provided in the ribs. This prior art sealing device requires relatively high expense for the installation and removal thereof, because it is difficult to assemble the individual segments in the steam generator, and lines to the pressure reservoir must be carried to the outside. Furthermore, the conventional device can only be subjected to pressure from one side. Moreover, sealing rings that are subjected to pressure are very likely to malfunction. The rings become porous when under long-term strain and can burst. Even a very slight leak in the sealing ring prevents adequate sealing at the pipe connector and makes the sealing device unusable.

It is accordingly an object of the invention to provide a sealing device for pipe connectors discharging into a vessel, in particular a steam generator, which overcomes the hereinafore-mentioned disadvantages of the heretofore-known devices of this general type, which is secure, which can be installed without tools or auxiliary devices and with which no supply lines need to be run to the outside. Furthermore, the time for installation or removal should be shortened, and the sealing device should withstand high pressures.

With the foregoing and other objects in view there is provided, in accordance with the invention, a sealing device for pipe connectors discharging into a vessel, especially a steam generator, comprising a retaining ring having a flange and being disposed at the mouth of the pipe connector and tightly joined to the wall of the vessel, a rigid disk closing off the opening of the pipe connector, a seal disposed between the rigid disk and the flange, and fast-action clamping elements extending through slits formed in the rigid disk and slits formed in the retaining ring, the fast-action clamping elements being supported on the disk and locked and braced on the retaining ring for securing the rigid disk to the flange with the interposition of the seal.

In this way, the sealing or pressing force required is only brought to bear by means of fast-action clamping elements that can be actuated by hand, so that the sealing device can be installed in a short time even by unskilled personnel and removed again once test procedures have been performed.

In accordance with another feature of the invention, the slits are axially disposed in the disk and in the flange of the retaining ring.

In accordance with a further feature of the invention, the slits formed in the disk are fastening slits, the slits formed in the flange of the retaining ring are congruent with the slits formed in the disk, the fast-action element includes a support body having a pivot point, a bolt being guided in the support body and having one end with a joint and another end with a hammer head, a toggle lever being supported in the joint and having another joint, and a connecting rod supported in the other joint and connected to the pivot point on the support body, the hammer head be passed through the slits in the disk and in the flange, and the hammer head being locked by rotation and being braced by actuation of the toggle lever. These features prevent clamping elements from cutting into the retaining elements.

In accordance with an added feature of the invention, the joints are disposed in a common plane, and the toggle lever has a stop disposed thereon causing the other joint to move outward beyond the common plane when the lever is pressed downward, providing a self-locking action of the toggle lever.

In accordance with an additional feature of the invention, the rigid disk is formed of a first disk half facing toward the pipe connector and a second disk half facing toward the vessel, the retaining ring has a hollow throat formed therein, the first disk half is disposed in the hollow throat, the first disk half and the flange are spaced apart defining a gap therebetween, the seal at least covers the gap, and only the second disk half is braced on the flange by means of the fast-action elements. These features permit easy subdivision of the disk halves, if the pipe connectors leading into the vessel are larger than the manhole connectors through which the sealing device is introduced, yet they do not require the individual segments of the disk or disk halves to be specially screwed to one another.

In accordance with yet another feature of the invention, the retaining ring has an annular indentation formed therein for centering the seal.

In accordance with yet a further feature of the invention, there are provided retractable carrying handles disposed on a side of the first disk half facing the vessel, and reinforcing ribs having recesses formed therein forming carrying handles disposed on a side of the second disk half facing the vessel. The reinforcing ribs are disposed on the outside of both disk halves in order to allow pressure to prevail on both sides of the sealing device.

In accordance with yet an added feature of the invention, the two disk halves are subdivided into at least two segments and the seal is in the form of a disk seal.

In accordance with yet an additional feature of the invention, the disk seal is formed of rubber, and the first disk half is in the form of a retaining panel for the rubber disk seal.

In accordance with still another feature of the invention, the segments are subdivided along dividing lines, and the dividing lines of the segments of the second disk half are offset with respect to the dividing lines of the segments of the first disk half.

In accordance with a concomitant feature of the invention, the one end of the bolt has a thread formed thereon, and including a nut screwed on the thread and attached to the first-mentioned joint of the bolt supporting the toggle lever for adjusting the clamping force of the fast-action clamping element.

Other features which are considered as characteristic for the invention are set forth in the appended claims.

Although the invention is illustrated and described herein as embodied in a sealing device for pipe connectors discharging into a vessel, in particular a steam generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
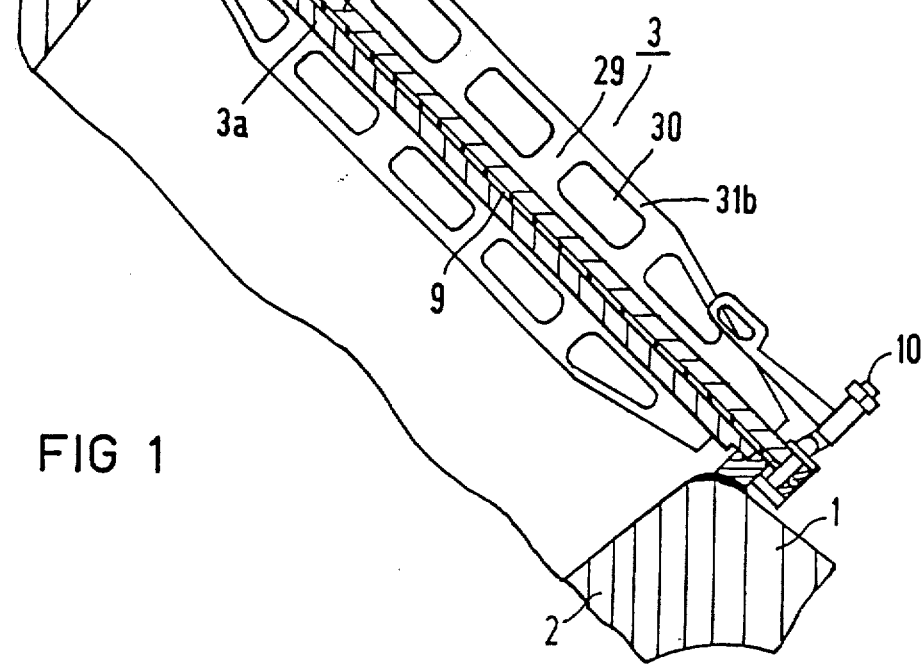
FIG. 1 is a fragmentary, diagrammatic, cross-sectional view of a sealing device having two disk halves.
Figure 3:
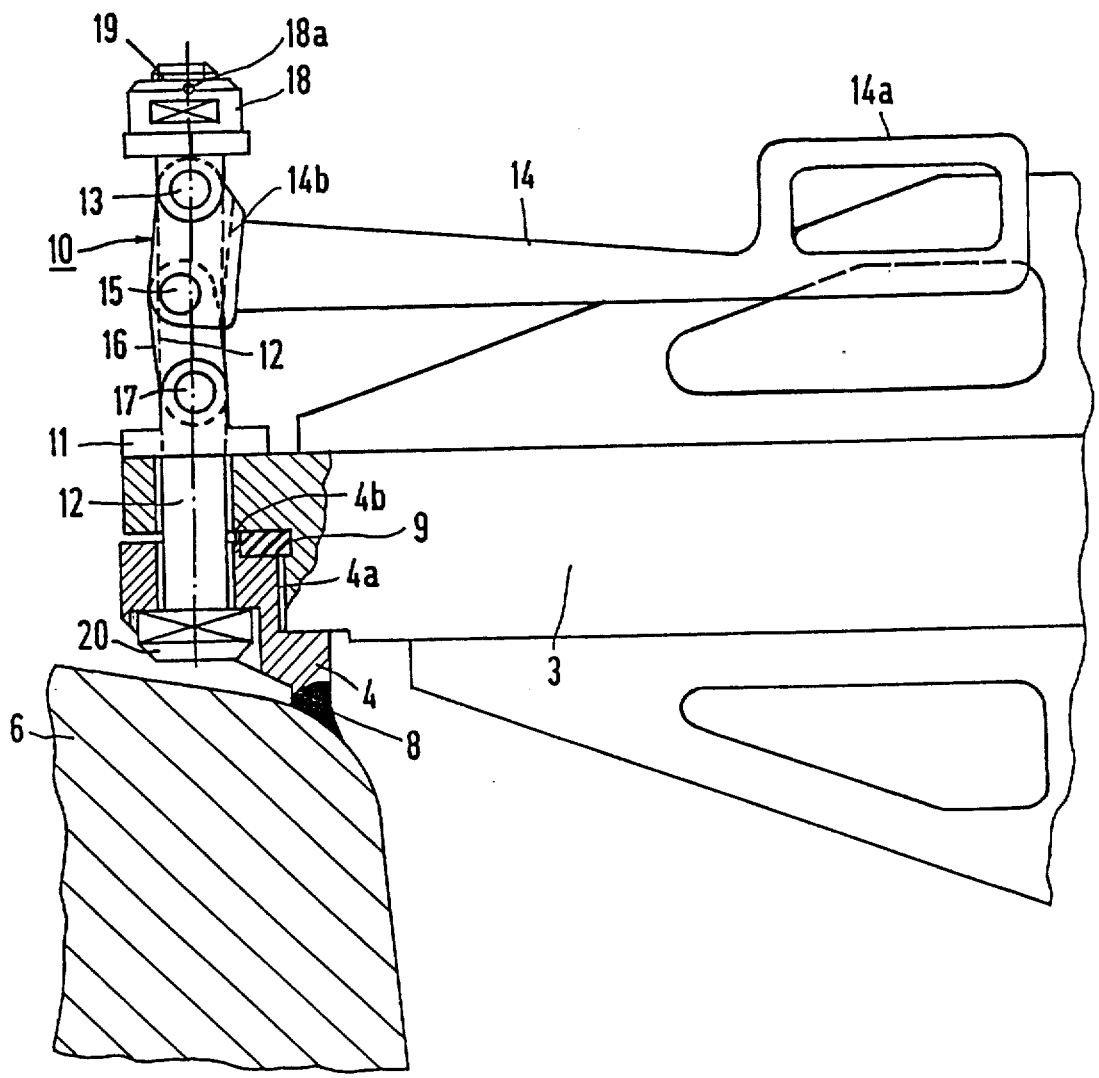
Figure 4:
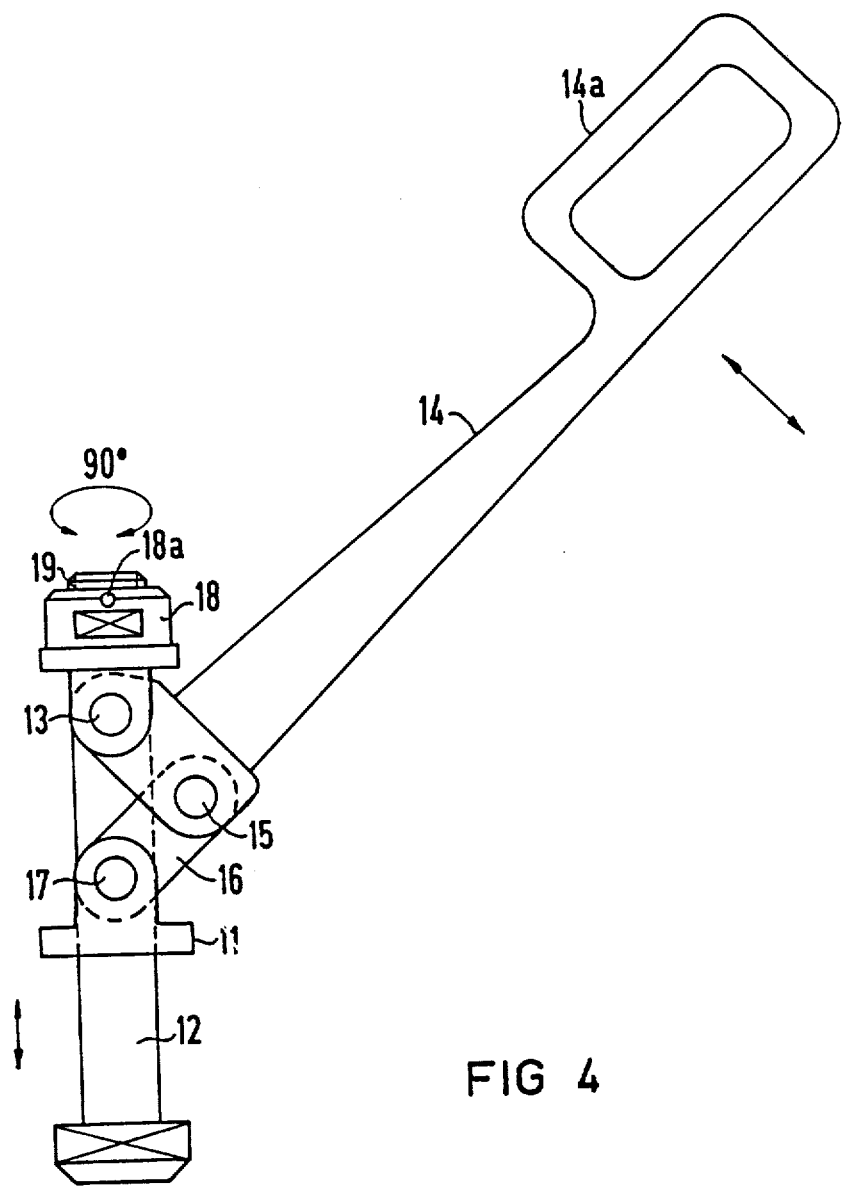

Referring now to the figures of the drawings in detail and first, particularly, to FIG. 1 thereof, there is seen a concave wall portion 1 of a vessel 7 constructed as a steam generator. Discharging into the wall portion 1 is the end of a pipe connector or stub 2, which is connected through a pipeline and a coolant pump to a reactor pressure vessel, from which a primary medium flows to the steam generator and is returned back to the reactor pressure vessel. When the reactor pressure vessel and the primary loop are tested at repeated intervals, the reactor is shut down and the water level in the reactor pressure vessel is lowered to approximately the middle loop connector, as a result of which the steam generator hemispheres are evacuated.

A sealing device in the form of a rigid disk 3 according to the invention is removed from the mouth of the pipe connector 2 by an operator who climbs into the dry steam generator hemisphere through a non-illustrated manhole. Then the reactor pressure vessel is flooded once again for radiation shielding, and work can be performed on the flooded reactor pressure vessel and in the dry steam generator in parallel. This not only results in a reduction in the radiation exposure for the staff, but also a shorter total inspection time.

A retaining ring 4 having a flange 5 is disposed at the mouth of the pipe connector 2 in the steam generator and is tightly connected to the wall 6 of the steam generator. It is advantageous for the retaining ring 4 to be attached to the wall 6 by means of a water-tight weld seam 8 which is closed all the way around.

Figures 2, 2A:
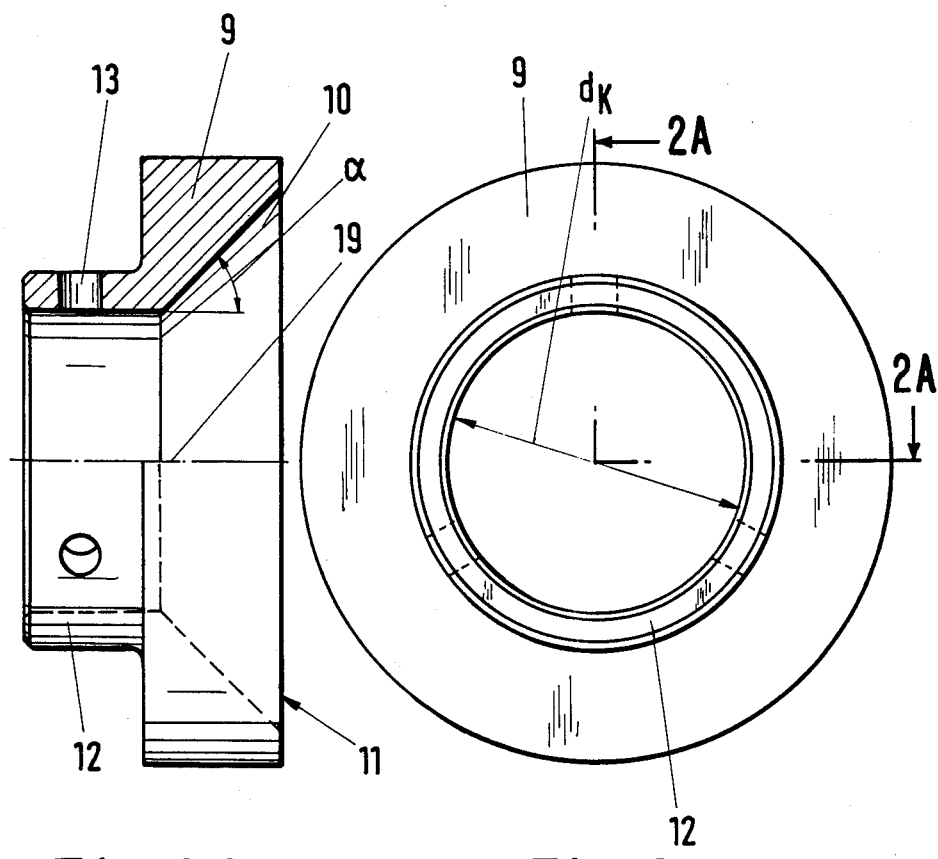
FIG. 2 is a partly broken-away elevational view of a sealing device having subdivided disk halves.
Figures 3, 3A:
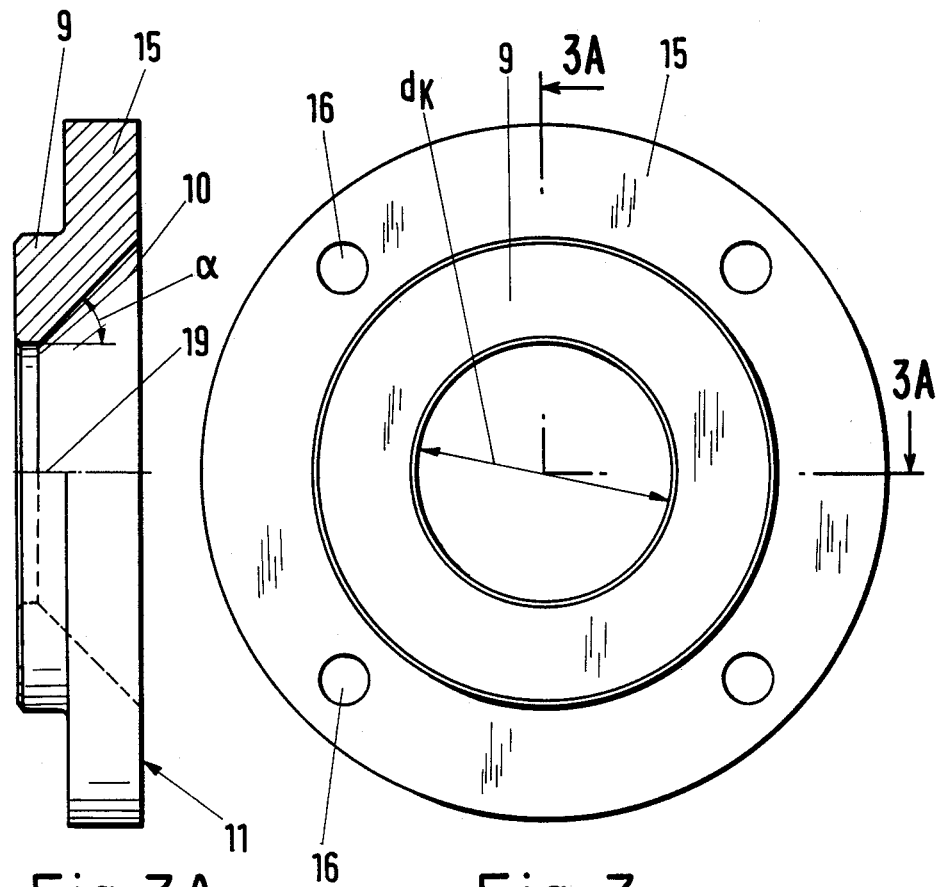
FIG. 3 is a cross-sectional view of a sealing device having a non-subdivided disk with a fast-action clamping device.

Fast-action clamping elements 10 which are also seen in FIG. 3 secure the rigid disk 3 to the flange 5 with the interposition of a seal 9. Slits 3s which are also seen in FIG. 2, are provided in the periphery of the rigid disk 3 and the axes thereof are parallel to the axis of the rigid disk 3. The slits 3s bulge out like a circle in the middle thereof. As is shown in FIG. 1, the flange 5 also has slits 5s, which are formed and placed in such a way that they coincide exactly with the slits 3s. The fast-action clamping elements 10 extend through the slits 3s in the disk 3 and through the slits 5s in the flange 5 of the retaining ring 4 and may be locked on the retaining ring.

Figure 4:
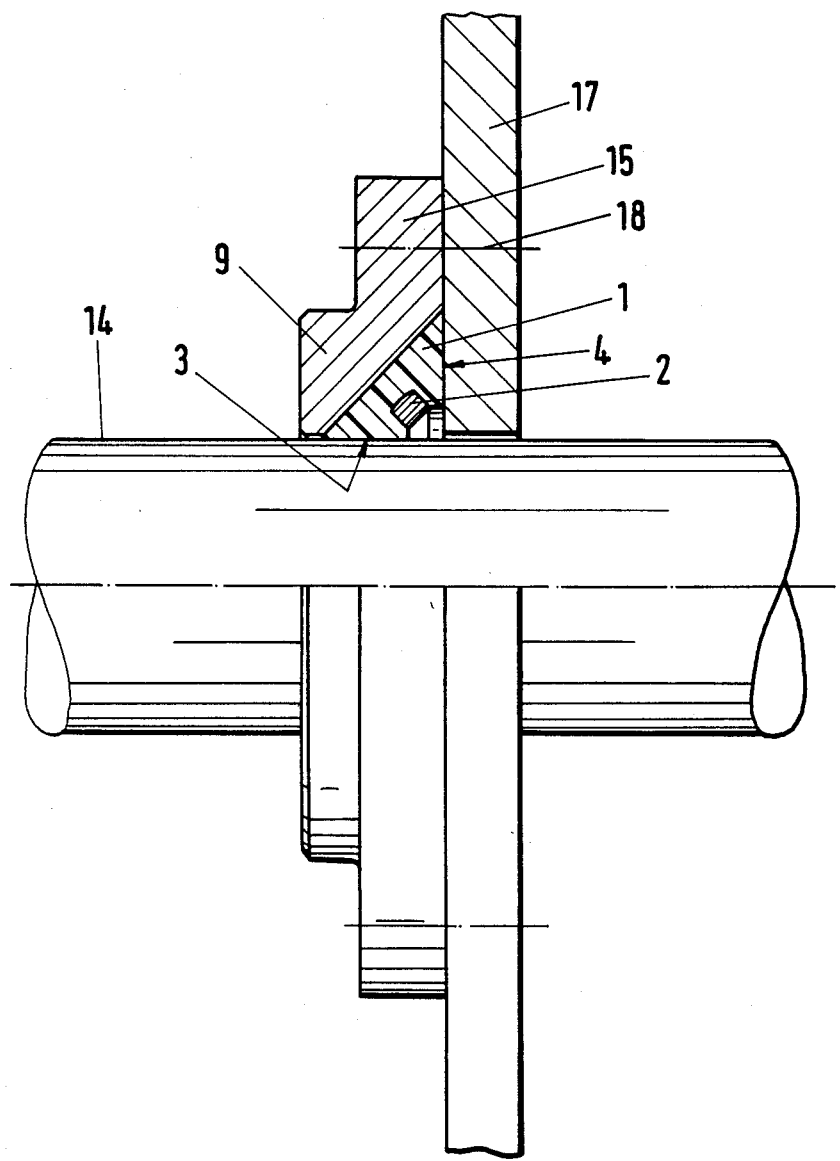
FIG. 4 is a side-elevational view of the fast-action clamping device in an opened position.
Figures 6, 6A:
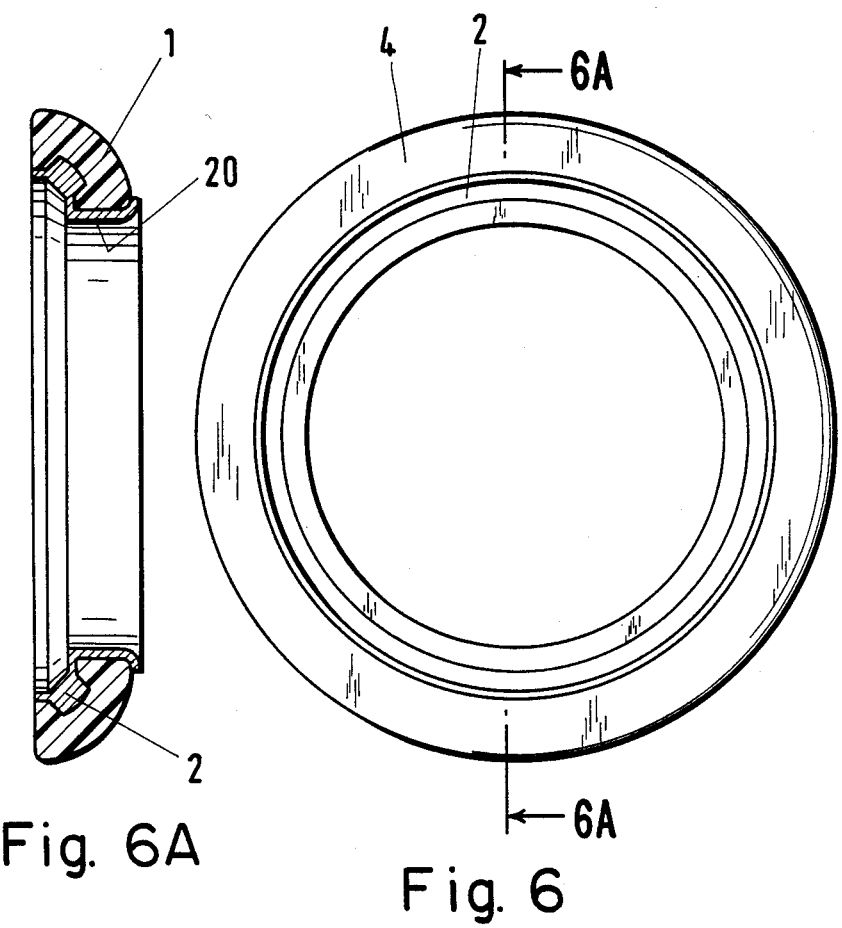
Figure 7A:
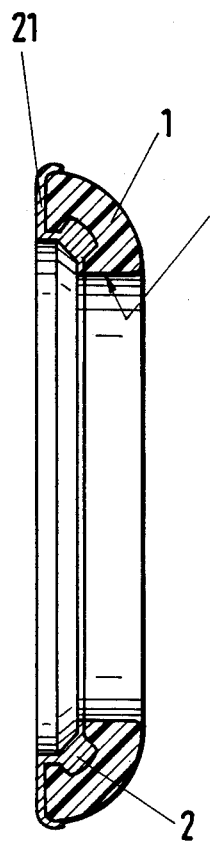
Figure 7:
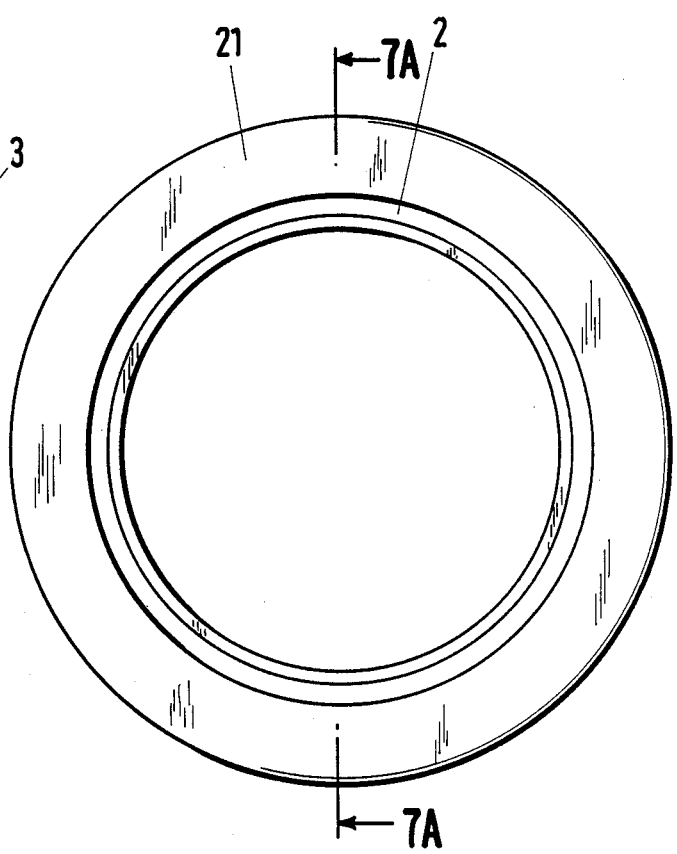
Figures 8, 8A:
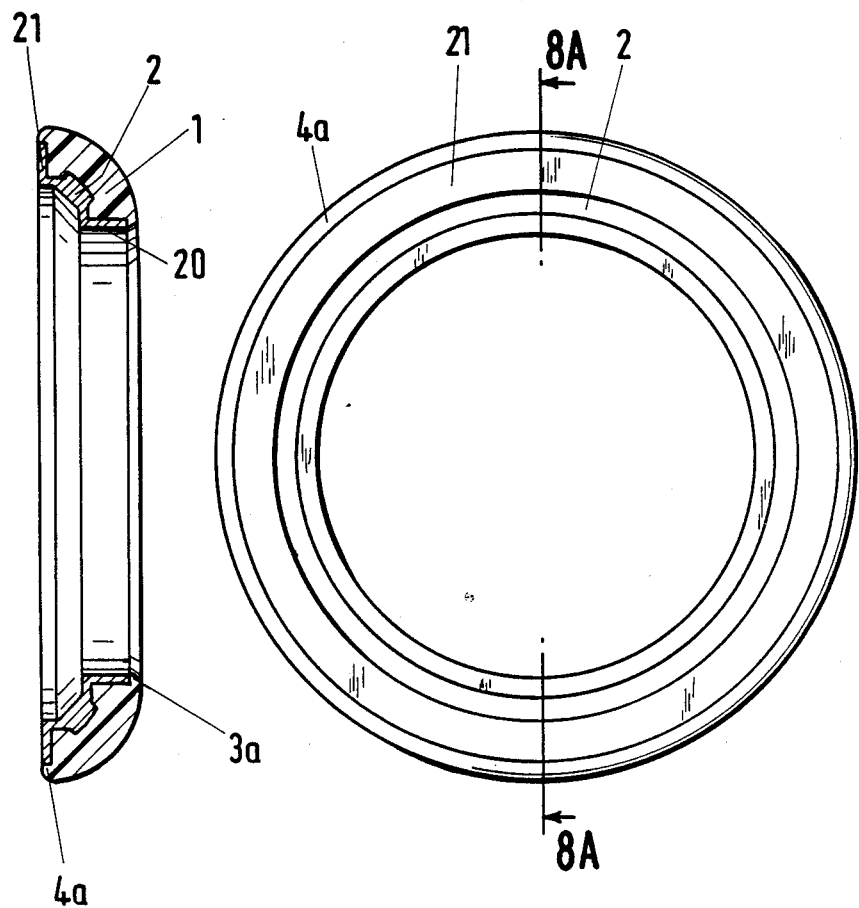
Figure 2:
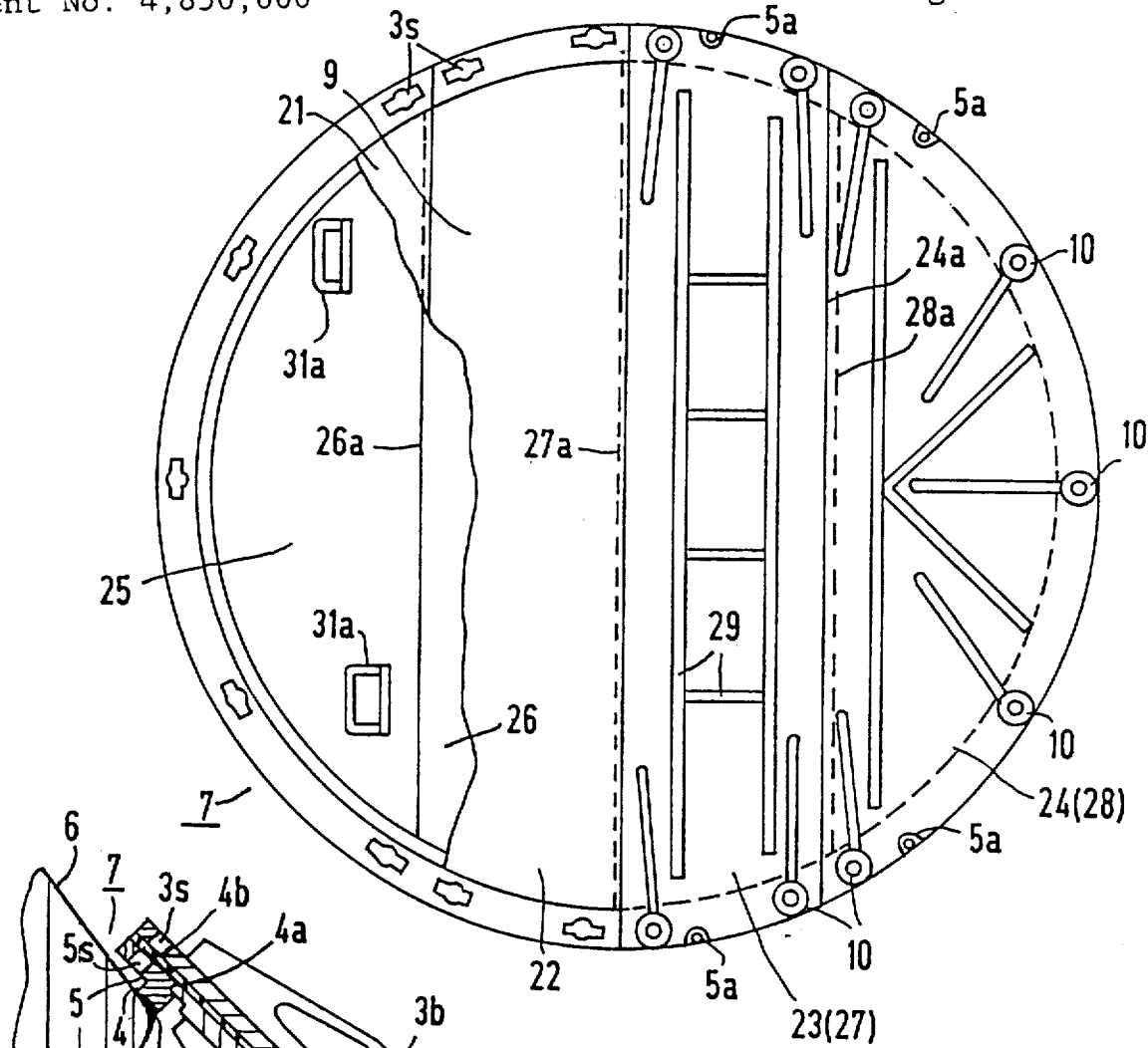

FIGS. 3 and 4 show that the fast-action clamping element 10 has a support body 11, in which a bolt 12 is guided in an axially displaceable manner. One end of the bolt 12 is provided with a thread 19 and a nut 18, on which a joint 13 is disposed. A toggle lever 14 is supported in the joint 13. One end of a connecting rod 16 is supported in a joint 15 of the toggle lever 14 and the other end thereof is supported in a pivot point 17 on the support body 11, so as to connect the toggle lever 14 to the support body 11. The other end of the bolt 12 has a hammer head 20, which for firm fastening of the disk 3 is passed through the slits 3s, 5s in the relaxed position of the toggle lever 14. The support body 11 is in the form of a sheath having a ring. The fast-action clamping element is locked by a rotation through 90°. If the toggle lever shown in FIG. 4 is pressed downward into the position shown in FIG. 3, the bolt with the hammer head is moved upward while the support body 11 is supported on the disk 3 and the disk is braced against the retaining ring 4.

It is advantageous to provide one connecting rod 16 on each respective side of the bolt and to construct the toggle lever 14 in a forked manner. This results in greater mechanical strength. It is also advantageous to place a stop 14b on the lever configuration in such a way that when the lever 14 is pressed downward, the joint 15 is moved outward somewhat beyond the common plane of the joints 13 and 17. A self-locking action of the lever configuration is thereby attained.

The clamping force can be adjusted by rotating the bolt 12 relative to the nut 18. After the adjustment, the nut 18 is secured by means of a cotter pin 18a.

It is particularly advantageous for the sealing body 3 to be formed of two disk halves 3a, 3b as seen in FIG. 1. The retaining ring 4 has a hollow throat 4a, into which the disk half 3a facing toward the pipe connector is introduced.

The seal 9 is provided in order to cover the gap between the disk half 3a facing toward the pipe connector and the flange 5. The seal 9 is constructed as a rubber ring or rubber disk and at least covers the gap. It is advantageous for an annular indentation 4b to be provided in the ring 4 for centering the seal 9. After the seal 9 is introduced, the disk half 3b facing toward the vessel which is provided with the slits 3s is placed upon the seal 9. In order to obtain precise seating of the disk half 3b facing toward the vessel, it is preferable to place centering pins 5a on the flange 5 or on the disk half 3b facing toward the vessel. After the introduction of the fast-action clamping elements 10 into the slits 3s and 5s, the two disk halves 3a, 3b are manually braced by means of the toggle lever 14.

For reasons of weight, or whenever the pipe connectors are larger than the manhole connector, it is advantageous for the disk halves 3a, 3b, which are optionally provided with ribs 29, to be subdivided into two or more segments 21, 22, 23, 24 or 25, 26, 27, 28, and to construct the seal 9 in the form of a disk seal as seen in FIG. 2. This makes it substantially easier for an operator to manipulate the sealing device.

In order to reduce the mechanical strain on the seal 9, the dividing lines 24a of the segments 21–24 of the disk half 3b facing toward the vessel are offset from the dividing lines 26a–28a of the segments 25–28 of the disk half 3a facing toward the pipe connector.

Each disk element formed by one segment 25–28 preferably has one or more retractable carrying handles 31a, 31b. Advantageously, carrying handles 31a, 31b for the disk segments 21–24 are formed by providing the ribs 29 with corresponding recesses 30 seen in FIG. 1.

Figure 5:
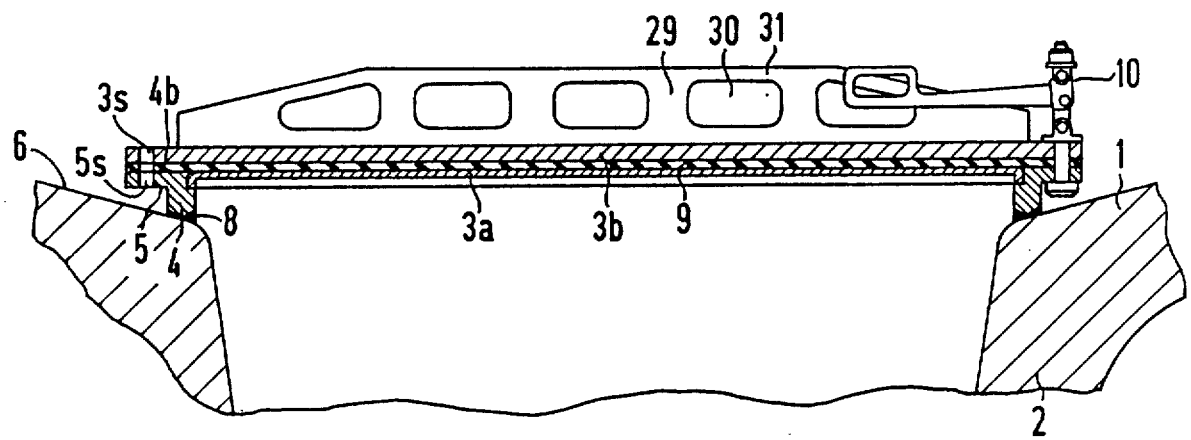
FIG. 5 is a view similar to FIG. 1 of a further sealing device.

In accordance with the FIG. 5 embodiment, if the disk 3 is subdivided into segments and pressure is only imposed from the pipe connector side, it is advantageous for the disk half 3a facing toward the pipe connector to be constructed as a retaining panel for the rubber disk serving as a seal 9.

The individual parts of the sealing device are dimensioned in such a way that they can be handled by one person in the vessel or in the steam generator hemisphere. All of the required structural parts are individually handed through the manhole into the steam generator hemisphere by a helper.

After the sealing device has been installed, the reactor pressure vessel is flooded once again in order to attain radiation-shielding action during the work performed on the reactor pressure vessel, and the required work can then be performed on the reactor pressure vessel and in the steam generator in parallel. In addition to reducing the radiation exposure for the staff, this results a considerable shortening of the inspection time. When the sealing device according to the invention is used, installation or removal of the sealing device becomes possible in a very short time with a small staff.

The foregoing is a description corresponding in substance to German Application No. P 37 37 609.8, dated Nov. 5, 1987, the International priority of which is being claimed for the instant application, and which is hereby made part of this application. Any material discrepancies between the foregoing specification and the aforementioned corresponding German application are to be resolved in favor of the latter.

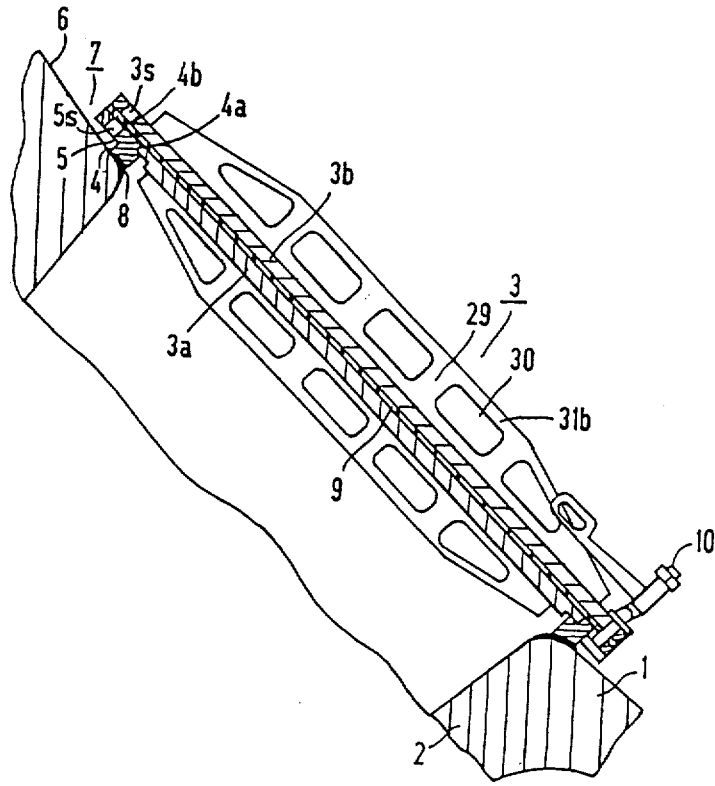

We claim:

1. Sealing device for pipe connectors having openings with mouths discharging into a vessel having a wall, comprising a retaining ring having a flange and being disposed at the mouth of the pipe connector and tightly joined to the wall of the vessel, a rigid disk closing off the opening of the pipe connector, said rigid disk being formed of a first disk half facing toward the pipe connector and a second disk half facing toward the vessel, said two disk halves each being subdivided into at least two segments, a seal disposed between said two disk halves and between said rigid disk and said flange, and fast-action clamping elements extending through slits formed in said rigid disk and slits formed in said retaining ring, said fast-action clamping elements being supported on said disk and locked and braced on said retaining ring for securing said rigid disk to said flange with the interposition of said seal.

2. Sealing device according to claim 1, wherein said slits are axially disposed in said disk and in said flange of said retaining ring.

3. Sealing device according to claim 1, wherein said retaining ring has a hollow throat formed therein, said first disk half is disposed in said hollow throat, said first disk half and said flange are spaced apart defining a gap therebetween, said seal at least covers said gap, and only said second disk half is braced on said flange by means of said fast-action elements.

4. Sealing device according to claim 3, including retractable carrying handles disposed on a side of said first disk half facing the vessel, and reinforcing ribs having recesses formed therein forming carrying handles disposed on a side of said second disk half facing the vessel.

5. Sealing device according to claim 3, wherein said seal is in the form of a disk seal.

6. Sealing device according to claim 5, wherein said disk seal is formed of rubber, and said first disk half is in the form of a retaining panel for said rubber disk seal.

7. Sealing device according to claim 5, wherein said segments are subdivided along dividing lines, and said dividing lines of said segments of said second disk half are offset with respect to said dividing lines of said segments of said first disk half.

8. Sealing device according to claim 1, wherein said retaining ring has an annular indentation formed therein for centering said seal.

9. Sealing device for pipe connectors having openings with mouths discharging into a vessel having a wall, comprising a retaining ring having a flange and being disposed at the mouth of the pipe connector and tightly joined to the wall of the vessel, a rigid disk closing off the opening of the pipe connector, a seal disposed between said rigid disk and said flange, and fast-action clamping elements extending through fastening slits formed in said rigid disk and slits formed in said retaining ring being congruent with said slits formed in said disk, said fast-action clamping elements being supported on said disk and locked and braced on said retaining ring for securing said rigid disk to said flange with the interposition of said seal, and said fast-action clamping elements including a support body having a pivot point, a bolt being guided in said support body and having one end with a joint and another end with a hammer head, a toggle lever being supported in said joint and having another joint, and a connecting rod supported in said other joint and connected to said pivot point on said support body, said hammer head being passed through said slits in said disk and in said flange, and said hammer head being locked by rotation and being braced by actuation of said toggle lever.

10. Sealing device according to claim 9 wherein said joints are disposed in a common plane, and said toggle lever has a stop disposed thereon causing said other joint to move outward beyond said common plane when said lever is pressed downward, providing a self-locking action of said toggle lever.

11. Sealing device according to claim 9 wherein said one end of said bolt has a thread formed thereon, and including a nut screwed on said thread and attached to said first-mentioned joint of said bolt supporting said toggle lever for adjusting the clamping force of said fast-action clamping element.

* * * * *

UNITED STATES PATENT AND TRADEMARK OFFICE
CERTIFICATE OF CORRECTION

PATENT NO. : 4,850,600

DATED : July 25, 1989

INVENTOR(S) : Erich Kaetscher et al

It is certified that error appears in the above-identified patent and that said Letters Patent is hereby corrected as shown below:

The title page should be deleted to appear as per attached title page.

Figures 1-8 should be deleted to be replaced with Figures 1-5 as shown on the attached sheets.

Signed and Sealed this

Twentieth Day of November, 1990

Attest:

HARRY F. MANBECK, JR.

Attesting Officer

Commissioner of Patents and Trademarks

United States Patent [19]

Kaetscher et al.

[11] Patent Number: 4,850,600
[45] Date of Patent: Jul. 25, 1989

[54] SEALING DEVICE FOR PIPE CONNECTORS DISCHARGING INTO A VESSEL, IN PARTICULAR A STEAM GENERATOR

[75] Inventors: Erich Kaetscher, Marloffstein; Jakob Stauner, Nuremberg; Alexander Huemmeler, Roettenbach, all of Fed. Rep. of Germany

[73] Assignee: Siemens Aktiengesellschaft, Munich, Fed. Rep. of Germany

[21] Appl. No.: 127,801

[22] Filed: Dec. 2, 1987

[30] Foreign Application Priority Data

Nov. 5, 1987 [DE] Fed. Rep. of Germany ....... 3737609

[51] Int. Cl.⁴ .................................................. F16J 15/02
[52] U.S. Cl. ........................................ 277/101; 138/89; 220/314; 411/350
[58] Field of Search ............................. 277/101; 138/89; 220/256, 314, 315; 411/179, 340, 350, 351, 349, 337, 549, 550, 551, 347, 141, 546; 384/420

[56] References Cited

U.S. PATENT DOCUMENTS

| | | | |
|---|---|---|---|
| 2,593,712 | 4/1952 | Wells et al. | 220/314 X |
| 3,548,881 | 12/1970 | Pavan | 220/314 X |
| 4,083,468 | 4/1978 | Batchelor | 220/256 X |
| 4,279,356 | 7/1981 | Amorese et al. | 220/314 |
| 4,299,396 | 11/1981 | Becker et al. | 277/101 X |
| 4,335,883 | 6/1982 | Le Roux et al. | 277/101 X |
| 4,436,220 | 3/1984 | Simmons | 220/256 X |
| 4,667,701 | 5/1987 | Evans et al. | 220/314 X |
| 4,690,070 | 9/1987 | Miller | 220/314 X |

Primary Examiner—Frankie L. Stinson
Attorney, Agent, or Firm—Herbert L. Lerner; Laurence A. Greenberg

[57] ABSTRACT

A sealing device for pipe connectors discharging into a vessel includes a retaining ring having a flange and being disposed at the mouth of the pipe connector and tightly joined to the wall of the vessel. A rigid disk closes off the opening of the pipe connector. A seal is disposed between the rigid disk and the flange. Fast-action clamping elements extend through slits formed in the rigid disk and slits formed in the retaining ring. The fast-action clamping elements are supported on the disk and locked and braced on the retaining ring for securing the rigid disk to the flange with the interposition of the seal.

11 Claims, 4 Drawing Sheets